March 31, 1953 — E. G. BOICE — 2,633,374
COUPLING MEMBER
Filed Oct. 1, 1948 — 2 SHEETS—SHEET 1
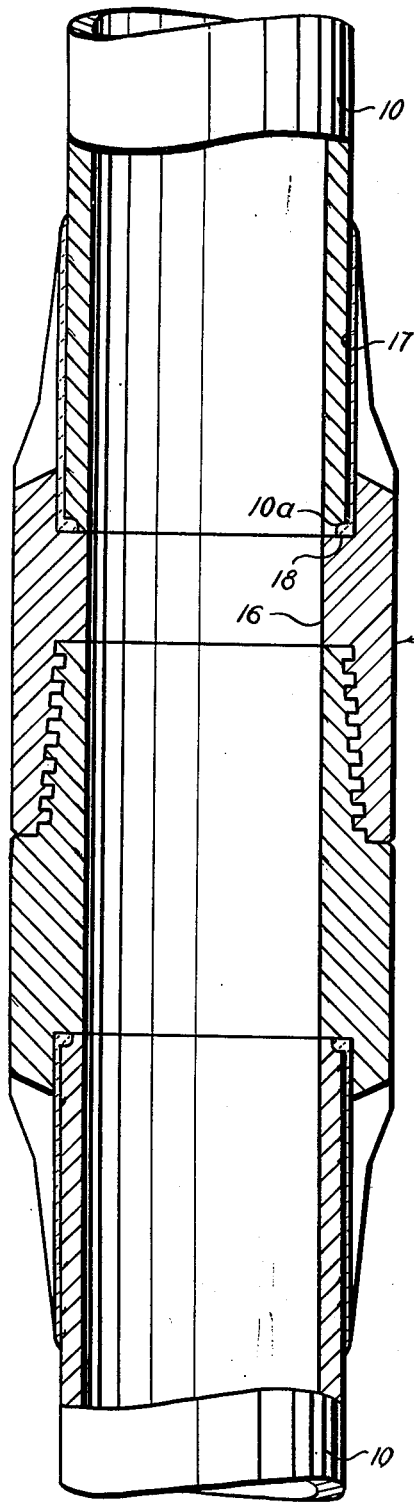
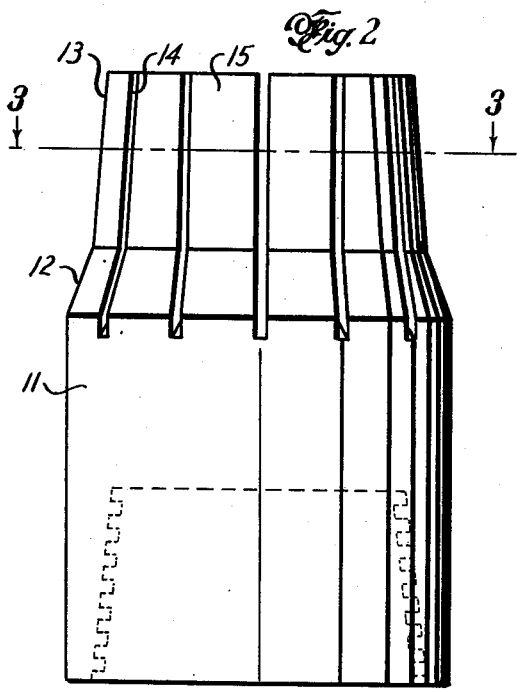
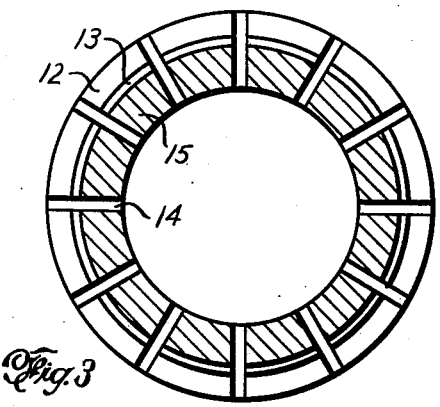
Elvin G. Boice
INVENTOR March 31, 1953     E. G. BOICE     2,633,374
COUPLING MEMBER
Filed Oct. 1, 1948     2 SHEETS—SHEET 2
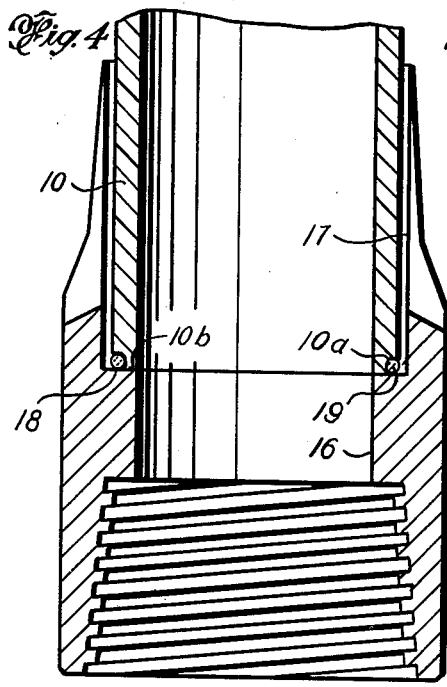
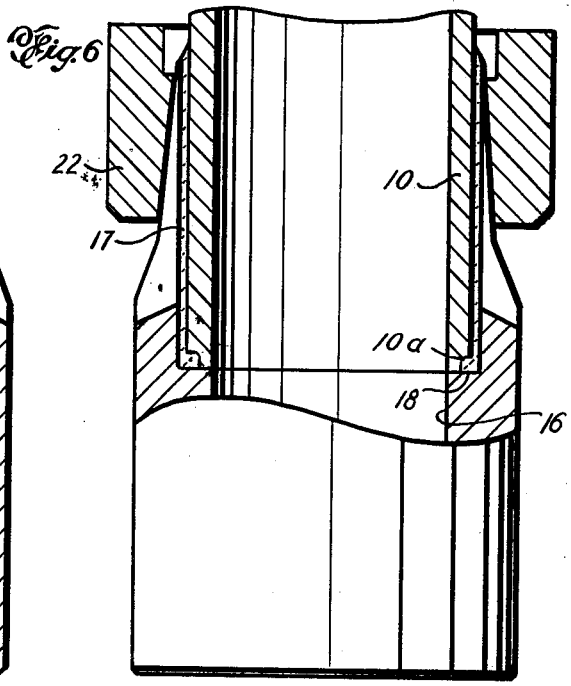
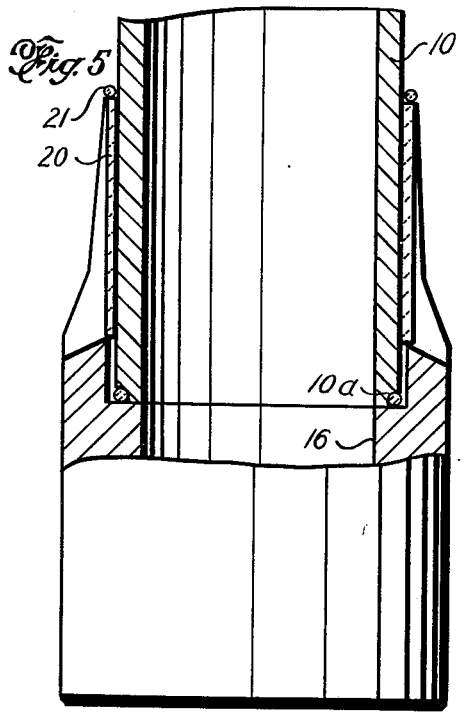
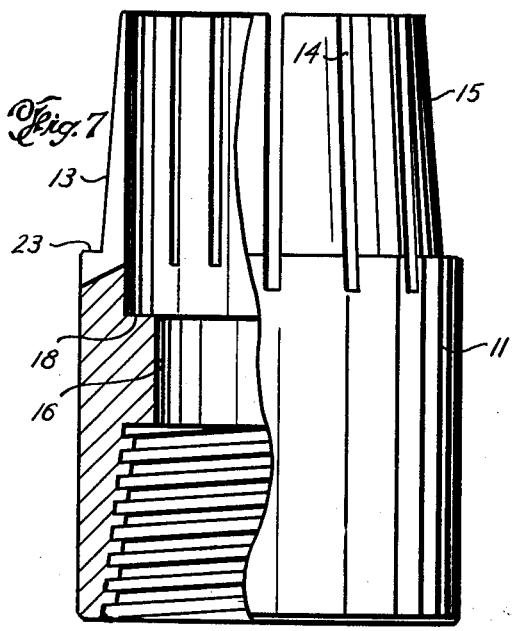
INVENTOR
Elvin G. Boice
BY
ATTORNEYS Patented Mar. 31, 1953

2,633,374

UNITED STATES PATENT OFFICE 2,633,374

COUPLING MEMBER

Elvin G. Boice, Houston, Tex., assignor to Reed Roller Bit Company, Houston, Tex., a corporation of Texas Application October 1, 1948, Serial No. 52,365

2 Claims. (Cl. 285—118)

This invention relates to new and useful improvements in coupling members, such as tool joints and methods of applying the same to pipe.

As is well known, drill pipe such as is used in the well drilling industry, is manufactured in predetermined lengths or sections and it has been the general practice to provide each length with upset or enlarged ends. Each upset end is ordinarily threaded and the usual type of tool joint is utilized to connect the ends of adjacent lengths or sections of pipe to each other. The upset portion has been found necessary in order to transfer the severe fatigue stresses from the thinner main portion of the pipe to the heavier and more rigid upset ends without danger of fatigue failures adjacent the extremity of the tool joint or at the tool joint threads. Because the provision of the upset or enlarged ends presents certain manufacturing difficulties as well as subsequent shipping problems, attempts have been made to manufacture plain end drill pipe and subsequently apply the tool joint thereto but because of the relatively broad tolerances acceptable in drill pipe manufacture, it is substantially impossible for a particular tool joint having a selected bore size to have a universal fit. In other words, due to the allowable manufacturing variations in the exterior diameter of the pipe, an attempt to apply or attach a tool joint to said pipe usually involves a machining operation to remove material from the pipe and thereby properly size the same to obtain the required fit. This is not only time consuming but also results in a change in the wall thickness of the pipe which creates a potential point of fatigue failure.

It is, therefore, one object of the present invention to provide an improved tool joint which may be readily applied to a conventional plain end drill pipe of usual manufacture without the necessity of performing any operation or making any change in the exterior diameter of said pipe, whereby said joint is universally applicable to the varying outside diameters of all plain end pipe of a selected bore size.

An important object of the invention is to provide an improved tool joint which may be applied to plain end drill pipe and which, when applied, produces or forms an upset portion adjacent the end of the pipe, whereby excellent stress transmission and distribution between the pipe and tool joint is had and fatigue failures at this point are substantially eliminated.

A particular object of the invention is to provide an improved tool joint which may be permanently bonded or attached to a plain end drill pipe, as by brazing, whereby the attachment may be made with a relatively low degree of applied heat so that the original or normal heat treatment of the tool joint is not impaired and also whereby the attachment may be readily accomplished at any location having portable bonding equipment, such as on a well rig.

Another object of the invention is to provide an improved tool joint, of the character described, which has one extremity engaging over the end portion of the drill pipe with said extremity being so arranged that the bonding material will flow between all areas of contact between said joint and said pipe whereby a permanent rigid connection, which for all practical purposes makes the joint and pipe an integral structure, is produced. The particular arrangement and construction of the parts being such that visual examination of the bonded or brazed connection may be easily made to assure than an efficient brazing operation has been carried out.

Still another object of the invention is to provide an improved tool joint having that portion of the joint which telescopes or engages the pipe end formed with a plurality of relatively elongate segmental elements or fingers, with said elements or fingers having sufficient inherent movement to compensate for variations in pipe diameter, whereby said joint may be readily applied to standard or conventional manufactured plain end pipe; the construction being such that when the joint is in its attached position, the elements or fingers may undergo individual deformation to obviate or prevent high stresses and at the same time the spacing between said elements or fingers may function to eliminate circumferential fatigue failures, which circumferential fatigue as well as said high stresses would normally occur in a joint having a continuous annular surface bonded to the pipe.

A further object of the invention is to provide an improved method of attaching a tool joint to a plain end pipe wherein the tool has one extremity formed with longitudinal slots, said method including, the steps of interposing a bonding material between the pipe end and joint, placing a bonding material within the slots of the joint as well as at the point of contact between the extremity of the joint and the pipe, and then heating the joint to cause the bonding material to flow between all areas of contact between the joint and pipe, whereby a permanent bond between the parts is produced; the method also contemplating the step of clamping the joint in position on the pipe immediately following the heating step to assure proper bonding of said joint to the pipe.

Other and further objects of this invention will appear from the following description.

In the accompanying drawings, which form a part of the instant specification, are to be read in conjunction therewith, and wherein like reference numerals are employed to indicate like parts in the various views:

Figure 1 is a transverse, vertical section of an improved tool joint, constructed in accordance with the invention, and illustrating the same connecting adjacent sections of drill pipe, Figure 2 is an elevation of the box member or section of the tool joint, Figure 3 is a horizontal cross-sectional view, taken on the line 3—3 of Figure 2, Figure 4 is a transverse sectional view, illustrating the first step in the method of applying the tool joint to a drill pipe, Figure 5 is a similar view, illustrating the disposition of the bonding material prior to the application of heat, Figure 6 is a view, similar to Figures 4 and 5 showing the joint mounted within a clamp immediately following the heating step, and Figure 7 is a view, partly in section and partly in elevation of a slightly modified form of the invention.

In the drawings, the letter A designates the improved tool joint which is adapted to connect the adjacent sections or lengths of plain end pipe 10 to each other. The tool joint A comprises a pair of members which are coupled together by a pin and box connection and the outer ends of the tool joint are permanently bonded, as will be explained, to the end portions of the adjacent pipe sections. The two members of the tool joint, except for the fact that one has an internally threaded box and the other has an externally threaded end, are identical in construction and their outer or free ends are attached to the plain end drill pipe in a similar manner.

Each tool joint member includes a generally cylindrical portion 11 which is formed at that end of the member where the pin or box is located, which may be referred to as the inner end. The outer end portion of the member beyond the cylindrical portion 11 is gradually reduced so that the external diameter of said member at its outer extremity is only slightly larger than the external diameter of the drill pipe 10 to which the member is to be connecetd. As is clearly shown in Figure 2, the external surface of the member has the annular tapered surface 12 adjacent to and extending from the cylindrical body portion and beyond the surface 12, the member is reduced toward its outer extremity by the elongate conical surface 13. As illustrated, the surface 13 is disposed at a lesser angle with respect to the longitudinal axis of the member than the surface 12. However, if desired, the reduction may be along a continuous tapered surface extending from the cylindrical body portion 11 to the outer reduced extremity of the member.

A plurality of longitudinally disposed slots 14 are provided in the tool joint member and extend from the outer reduced end throughout the inclined surfaces 12 and 13 and terminate within the cylindrical portion 11 of said member. As is clearly shown in Figure 3, the slots 14 are located in radial planes and form a plurality of segmental elements or fingers 15 which are disposed circumferentially around the member. It will be evident that because of the slots or spaces 14 between the elements or fingers, said elements or fingers may undergo a limited movement in a radial direction.

The tool joint member is formed with an axial bore 16 and the upper portion of this bore is enlarged as indicated at 17, whereby an internal annular shoulder 18 is formed within the bore. As is clearly shown in Figure 1, the enlarged portion 17 of the bore extends entirely through the tapered portion of the member and the shoulder 18 is disposed in a plane below the lower ends of the slots 14 and segmental elements or fingers 15. To insure a perfect braze bond between the outer surface of the drill pipe 10 and the surface of the bore 17, a pickling or sandblasting operation on these surfaces may be performed to remove all foreign matter; also, both surfaces are preferably coated with a suitable brazing flux in preparation of the brazing material which is to be employed.

In attaching or applying the tool joint member to the plain end drill pipe 10, the end of said drill pipe is chamfered or recessed to form an annular groove 10a therein. A suitable ring of bonding or brazing material 19 is seated upon the internal shoulder 18 within the bore of the member. The end portion of the drill pipe 10 is then inserted within the bore of the member, said drill pipe entering the enlarged portion 17 of said bore, as is clearly shown in Figure 4. The drill pipe is inserted entirely within this enlarged portion of the bore so that the end 10b of said pipe engages the shoulder 18.

The bonding or brazing material 19, which is supported upon the shoulder 18, is retained in the annular recess or groove 10a. As has been pointed out, manufacturing tolerances of drill pipe are relatively large, and thus drill pipe of a selected bore size may vary in external diameter. Also, the pipe may be slightly out of round or may occasionally have flat spots on its circumferential surface. However, since the segmental elements or fingers 15 may undergo some radial movement, it is apparent that pipe of varying diameters or imperfect circumference may be readily inserted within the bore 17 between said fingers and thus, the joint member is adaptable for use to accommodate pipes of varying diameter and varying circumferential shape.

After the drill pipe has been inserted within the joint with its end abutting the shoulder 18 and the bonding material 19 on said shoulder, additional bonding material 20 is placed within the slots 14. Also, a ring 21 of bonding material is placed around the reduced outer end of the tool joint at the point of engagement of this reduced end with the pipe 10, this step of the method being illustrated in Figure 5.

It is desirable that the bonding or brazing material extend throughout the full lengths of the slots 14 and after this material has been properly placed, the pipe with the joint thereon is placed into a suitable furnace so that the desired or required heat may be applied. Any suitable brazing metal may be employed as the bonding material and it is preferable that such brazing metal be capable of reaching brazing temperature at approximately 1200° Fahrenheit. Such heat, although sufficient to perform an efficient brazing operation, is not sufficient to affect or impair the original heat treating of the material of which the tool joint member is constructed. In applying the heat to that end of the tool joint member being brazed or bonded to the pipe, the opposite end of said member, which is that end comprising the cylindrical portion 11 and having either the pin or box located adjacent thereto, may be maintained cool by any suitable water circulating system or apparatus.

After brazing temperature has been reached, the joint with the inserted pipe is removed from the heating furnace and the bonding or brazing material is permitted to solidify. It is noted that when the bonding or brazing material is in a molten state, said material may flow between all of the contact areas between the joint and the pipe 10. The material 19 on the shoulder will flow between the end of the pipe and the shoulder 18, and some of said material will flow upwardly between the end portion of the pipe 10 and the lower portion of the enlarged bore 17. This material will be joined by some of the bonding or brazing material 20 which was disposed within the slots 14, and which flows around the exterior of the pipe. The material 20 within the slot not only flows around the exterior of the pipe 10, but also passes beneath the segmental elements or members 15 so that these elements are firmly bonded to the pipe. In addition, the ring 21 of bonding material which surrounds the ends of the segmental members at each extremity of the joint will firmly bond said ends to the pipe. With this arrangement, a firm bond between all contacting surfaces is obtained, and the joint is permanently attached to the pipe.

It is noted that in some instances, it may be desirable to dispose the joint within a suitable tapered clamp immediately following its removal from the heating furnace, and in Figure 6, a clamp 22 is illustrated as engaged around the outer portion of the tool joint member. This clamp is mounted in position around the member and the pipe immediately after these parts are removed from the heating furnace and while the brazing material is still in a molten state. The clamp remains in position on the parts until the brazing or bonding material has solidified, and through the use of the clamp, firm contact of all of the segmental elements or fingers with the external surface of the pipe is assured.

After the bonding or brazing material has solidified, the joint is permitted to cool down to normal temperature, after which it is ready for use. Obviously, the pipe 10 will be firmly attached or bonded to the joint. The construction is such that when the joint is in its attached position, an upset portion, which for all practical purposes is integral with the drill pipe, is formed between the pipe and the threaded joint connection, and this upset portion functions to transfer the severe fatigue stresses from the relatively thin body of the drill pipe to the more rigid tool joint to eliminate fatigue failures. Also, when in attached position, the elements or fingers 15 may undergo independent or individual deformation whereby excessively high stresses which would be encountered in a member having a continuous annular surface, are avoided. The provision of the individual elements or fingers also eliminates circumferential fatigue failures because of the slots which are disposed between the fingers or elements and which break the continuity of the member. Because the bonding or attaching operation may be a simple brazing operation, it is evident that the joint may be readily applied to the drill pipe on the well rig or at any location where portable brazing equipment is available. The particular construction which forms the slots or spaces between the segmental elements or fingers makes it possible to visually examine the brazed joint to thereby assure that proper connection has been made. This is a distinct advantage over those joints where the final brazed connection is hidden from visual inspection.

When the tool joints A are made up on the drill pipe and are used in well drilling operations, the annular inclined surface 12 forms a beveled or inclined shoulder which may be engaged by the usual elevators (not shown) used in well drilling. Certain types of these elevators require a square shoulder, and in such case the joint A may be modified as shown in Figure 7. In this case, the elongate taper 13 is extended and in place of the inclined surface 12, an external annular shoulder 23 may be formed adjacent the cylindrical body portion 11 of the member. This modified form of the tool joint member would be applied to the drill pipe in the same manner hereinbefore described. In both instances, it is pointed out that the member is so constructed that when attached to the drill pipe, it provides the upset portion which transmits and evenly distributes the stresses and strains from the drill pipe to the tool joint connection.

While I have described and illustrated herein a preferred embodiment of my invention, it will be apparent therefrom that various modifications thereof may be made without departing from the intended scope of my invention as represented by the following patent claims.

Having described the invention, I claim:

1. The combination with a drill pipe of a coupling member including, a tool joint member comprising a tubular body having an axial bore, said body having radially spaced longitudinal slots extending inwardly from one end thereof whereby the material between the slots forms longitudinal resilient finger members at one end portion of the body, an internal annular abutment within the bore of the body spaced inwardly from the inner end of the slots, the well pipe being insertable within that end of the body having the resilient finger members thereon to form a resilient connection therebetween and having its end engageable with the internal abutment, said slots extending from said one end thereof inwardly substantially the distance of the portion of said pipe the body surrounds, said resilient finger members each having a tapered external surface which is gradually reduced in diameter from substantially the inner ends of the slots to said one end of said body, and bonding means between the abutment and the end of the pipe and also between the inner surfaces of the finger members and the outer surface of said pipe as well as within the slots between said finger members.

2. The combination with a drill pipe of a coupling member including, a tool joint member comprising a tubular body having an axial bore, said body having radially spaced longitudinal slots extending inwardly from one end thereof whereby the material between the slots forms longitudinal resilient finger members at one end portion of the body, an internal annular abutment within the bore of the body spaced inwardly from the inner end of the slots, the well pipe being insertable within that end of the body having the resilient finger members thereon to form a resilient connection therebetween and having its end engageable with the internal abutment, said slots extending from said one end thereof inwardly substantially the distance of the portion of said pipe the body surrounds, said resilient finger members each having a tapered external surface which is gradually reduced in diameter from substantially the inner ends of the slots to said one end of said body, bonding means between the abutment and the end of the pipe and also between the inner surfaces of the finger members and the outer surface of said pipe as well as within the slots between said finger members, and additional bonding means for bonding the outer ends of the finger members to the exterior surface of the pipe.

ELVIN G. BOICE.

REFERENCES CITED

The following references are of record in the file of this patent:

UNITED STATES PATENTS

| Number | Name | Date |
| --- | --- | --- |
| 1,268,980 | Krunholz | June 11, 1918 |
| 1,344,221 | Burns | June 22, 1920 |
| 1,770,852 | Hill | July 15, 1930 |
| 1,917,939 | Heeter | July 11, 1933 |
| 1,941,115 | Strenger | Dec. 26, 1933 |
| 1,993,269 | Fletcher | Mar. 5, 1935 |
| 2,033,122 | Cornell | Mar. 10, 1936 |
| 2,034,808 | Graham | Mar. 24, 1936 |
| 2,224,145 | Dugan | Dec. 10, 1940 |
| 2,279,831 | Lempert | Apr. 14, 1942 |
| 2,460,666 | Wurzburger | Feb. 1, 1949 |